United States Patent
Sridhar (10) Patent No.: US 9,077,667 B2
(45) Date of Patent: Jul. 7, 2015

(54) COMPUTING LATENCY INTRODUCED BY MEDIA TRANSCODING OPERATIONS

(71) Applicant: GENBAND US LLC, Frisco, TX (US)

(72) Inventor: Sriram Sridhar, Westford, MA (US)

(73) Assignee: GENBAND US LLC, Frisco, TX (US)

( * ) Notice: Subject to any disclaimer, the term of this patent is extended or adjusted under 35 U.S.C. 154(b) by 156 days.

(21) Appl. No.: 13/921,191

(22) Filed: Jun. 18, 2013

(65) Prior Publication Data

US 2014/0369344 A1     Dec. 18, 2014

(51) Int. Cl.
*H04L 12/66* (2006.01)
*H04L 12/741* (2013.01)
*H04L 29/06* (2006.01)

(52) U.S. Cl.
CPC ............ *H04L 45/74* (2013.01); *H04L 65/1003* (2013.01)

(58) Field of Classification Search
CPC .................................................. H04L 65/1003
USPC ........................................................ 370/352
See application file for complete search history.

(56) References Cited

U.S. PATENT DOCUMENTS

| 2009/0103524 | A1* | 4/2009 | Mantripragada et al. | 370/352 |
|---|---|---|---|---|
| 2009/0168769 | A1* | 7/2009 | Lu et al. | 370/389 |
| 2010/0208634 | A1* | 8/2010 | Eng et al. | 370/310 |
| 2010/0329130 | A1* | 12/2010 | Paine et al. | 370/252 |
| 2011/0075675 | A1* | 3/2011 | Koodli et al. | 370/401 |
| 2011/0270981 | A1* | 11/2011 | Stein et al. | 709/224 |
| 2012/0294159 | A1* | 11/2012 | Sridhar | 370/252 |
| 2013/0077632 | A1* | 3/2013 | Ishiguro et al. | 370/394 |
| 2013/0083808 | A1* | 4/2013 | Sridhar | 370/475 |
| 2013/0142085 | A1* | 6/2013 | Haspekian et al. | 370/259 |

\* cited by examiner

*Primary Examiner* — Asad Nawaz
*Assistant Examiner* — Syed Ali
(74) *Attorney, Agent, or Firm* — Fogarty, L.L.C.

(57) ABSTRACT

Systems and methods for computing latency introduced by media transcoding operations are described. In some embodiments, a method may include receiving incoming Real-Time Protocol (RTP) packets, each having time of arrival and a payload encoded with a first codec and receiving outgoing RTP packets, each having a time of transmission and a payload encoded with a second codec. The method may also include calculating a latency associated with a transcoding of at least one of the incoming RTP packets into at least one corresponding one of the outgoing RTP packets based upon a difference between the time of transmission of the at least one corresponding one of the outgoing RTP packets and the time of arrival of the at least one of the incoming RTP packets. In some cases, the incoming and outgoing RTP packets may be Voice-over-Internet Protocol (VoIP) packets.

16 Claims, 3 Drawing Sheets

COMPUTING LATENCY INTRODUCED BY MEDIA TRANSCODING OPERATIONS

TECHNICAL FIELD

This disclosure relates generally to telecommunications, and more specifically, to systems and methods for computing latency introduced by media transcoding operations.

BACKGROUND

Voice-over-Internet Protocol (VoIP) is a technology that enables the delivery of voice communications over IP networks. Some of the operations involved in a VoIP telephone call are similar to those of conventional digital telephony, and generally involve signaling, channel setup, digitization of analog voice signals, and encoding. Rather than being transmitted over a circuit-switched network, however, voice signals are packetized and transmitted over packet-switched networks (e.g., the Internet).

VoIP systems typically employ session control and signaling protocols that control the signaling, set-up, and tear-down of calls. These systems transport audio streams using media delivery protocols that encode voice, audio, or video. Various codecs (i.e., devices or programs capable of coding and/or decoding data streams) exist that optimize a media stream based on application requirements and/or network bandwidth. For example, some applications may rely on narrowband and compressed speech, whereas other applications may support high fidelity stereo codecs.

In some situations, a caller may initiate a VoIP communication from an environment that employs a given codec, and the called party may receive the call in another environment that uses a different codec. Therefore, in order to support that call, a VoIP system may at some point perform a "transcoding" operation, whereby data is converted from one encoding to another. There are presently many different codecs used by VoIP systems. For example, the International Telecommunications Union (ITU) prescribes numerous standard codecs (e.g., G.711, G.721, G.722, G.723, G.726, etc.) with varying characteristics such as bit rates, packet sizes, sampling rates, and the like.

SUMMARY

Embodiments disclosed herein are directed generally to systems and methods for computing latency introduced by media transcoding operations. In an illustrative, non-limiting embodiment, a method may include receiving an incoming Real-Time Protocol (RTP) packet including information encoded with a first codec, decoding the information using the first codec, encoding the decoded information using a second codec, the second codec different from the first codec, creating an outgoing RTP packet including the information encoded with the second codec, and computing a latency associated with decoding and encoding operations.

In some implementations, the receiving, decoding, encoding, and creating may be performed by a Session Border Controller (SBC) including or coupled to a Digital Signal Processor (DSP), and the computing may be performed by a packet analyzer. Also, the incoming and outgoing RTP packets may be Voice-over-Internet Protocol (VoIP) packets.

For example, computing the latency may include identifying the incoming RTP packet among a plurality of other incoming RTP packets as being correlated with the outgoing RTP packet among a plurality of other outgoing RTP packets. Identifying the incoming RTP packet as being correlated with the outgoing RTP packet may include extending a header of the incoming RTP packet to include a tag that uniquely identifies the incoming RTP packet with respect to the plurality of other incoming RTP packets. Also, creating the outgoing RTP packet may include copying the tag into a header of the outgoing RTP packet.

In some cases, computing the latency may include calculating a difference between a time of transmission of the outgoing RTP packet and a time of receipt of the incoming RTP packet. Computing the latency may also include computing the latency during a RTP call to which the incoming and outgoing RTP belong.

In another illustrative, non-limiting embodiment, a computing device may include a processor and a memory coupled to the processor, the memory configured to store program instructions executable by the processor to cause the computing device to: receive a plurality of incoming RTP packets and record a time of arrival of each of the plurality of incoming RTP packets, enable transcoding operations configured to transcode payload information within the plurality of incoming RTP packets, create a plurality of outgoing RTP packets using the transcoded payload information and record a time of transmission of each of the plurality of outgoing RTP packets, and provide the plurality of incoming and outgoing RTP packets to a packet analyzer, the packet analyzer configured to match at least one of the plurality of incoming RTP packets to a corresponding one of the plurality of outgoing RTP packets, the packet analyzer further configured to calculate a latency associated with a transcoding operation performed upon payload information within the at least one of the plurality of incoming RTP packets based upon a difference between a time of transmission of the corresponding one of the plurality of outgoing RTP packets and a time of arrival of the at least one of the plurality of incoming RTP packets.

For example, the computing device may be an SBC, the packet analyzer may be coupled to or part of the SBC, and/or the transcoding operations may be performed by a DSP coupled to or part of the SBC. Also, the incoming and outgoing RTP packets may be VoIP packets.

In some implementations, the program instructions may be further executable by the processor to cause the computing device to extend a header of the at least one of the plurality of incoming RTP packets to include a tag. To create the at least one of the plurality of outgoing RTP packets, the program instructions may be further executable by the processor to cause the computing device to insert the tag into a header of the corresponding one of the plurality of outgoing RTP packets.

In yet another illustrative, non-limiting embodiment, a computer-readable storage medium may have program instructions stored thereon that, upon execution by a computing system, cause the computing system to receive incoming Real-Time Protocol (RTP) packets, each having a payload encoded with a first codec and having a time of arrival, receive outgoing RTP packets, each having a payload encoded with a second codec and having a time of transmission, correlate one of the incoming RTP packets with a corresponding one of the outgoing RTP packets, and calculate a latency associated with a transcoding of the one of the incoming RTP packets into the corresponding one of the outgoing RTP packets based upon a difference between the time of transmission of the corresponding one of the outgoing RTP packets and the time of arrival of the one of the incoming RTP packets.

In some cases, the computing system may be a packet analyzer. The incoming and outgoing RTP packets may be received from an SBC. A header of the one of the incoming RTP packets may include a tag inserted by the SBC. And a header of the one of the outgoing RTP packets may include the tag inserted by the SBC.

In still another illustrative, non-limiting embodiment, a method may include receiving incoming RTP packets, each having time of arrival and a payload encoded with a first codec, receiving outgoing RTP packets, each having a time of transmission and a payload encoded with a second codec, and calculating a latency associated with a transcoding of at least one of the incoming RTP packets into at least one corresponding one of the outgoing RTP packets based upon a difference between the time of transmission of the at least one corresponding one of the outgoing RTP packets and the time of arrival of the at least one of the incoming RTP packets.

For example, the incoming and outgoing RTP packets may be VoIP packets. Further, a header of the at least one of the incoming RTP packets may be extended to include an identifier, and a header of the at least one of the outgoing RTP packets may include the identifier, each of the at least one of the incoming RTP packets being correlated with a corresponding one of the at least one of the outgoing RTP packets via respective identifiers.

BRIEF DESCRIPTION OF THE DRAWINGS

Reference will now be made to the accompanying drawings, wherein.

DETAILED DESCRIPTION

Embodiments disclosed herein are directed generally to systems and methods for computing latency introduced by media transcoding operations. In some implementations, a Session Border Controller (SBC) may have transcoding capabilities and may be employed when two user agents (software or devices acting on behalf of users) involved in the same Voice-over-Internet Protocol (VoIP) call use different voice codecs. The transcoding process may be performed, for example, by one or more Digital Signal Processors (DSPs) embedded within the SBC. It should be noted, however, that although some of the systems and methods described herein refer particularly to SBCs, other types of transcoding devices (e.g., a media gateway, etc.) may be used.

In some implementations, the transcoding process may involve extracting a payload found in an inbound VoIP packet originated by a calling party or by a media gateway device. For example, the VoIP packet may use the Real-Time Transport Protocol (RTP) or the Real Time Streaming Protocol (RTSP), generically referred to herein as the "RTP" protocol. The SBC may then feed the payload to the DSP, and the DSP may convert it into another payload based on a different codec supported by the called party. Then, the SBC may construct a new outbound VoIP packet with the converted payload, and it may transmit the VoIP packet to its destination.

The aforementioned transcoding operations introduce latency (i.e., a time delay) in the VoIP call, as seen from an end-to-end perspective, because of the processing overhead involved. A typical SBC onboard call transcoding process ties up the DSP as well as other resources, which can degrade the quality of a call. In most cases, delays of more than ~250 ms are often considered unacceptable by network operators. Ideally, a transcoded call should have but a small impact (e.g., less than ~5 ms) in terms of additional latency introduced when compared to a non-transcoded call (i.e., "pass-through").

Currently, however, there is no standard approach to measure the latency introduced by transcoding voice from one codec to another. Available RTP packet analyzers cannot actually measure the transcoding latency because the payload, sequence number, time stamp, synchronization source identifier (SSRC), and Contributing source IDs (CSRC) found in a transcoded, outgoing RTP packet are different from those found in a source or incoming RTP packet. Consequently, there is no mechanism capable of correlating an incoming RTP packet with a corresponding outgoing, transcoded RTP packet.

Figure 1:
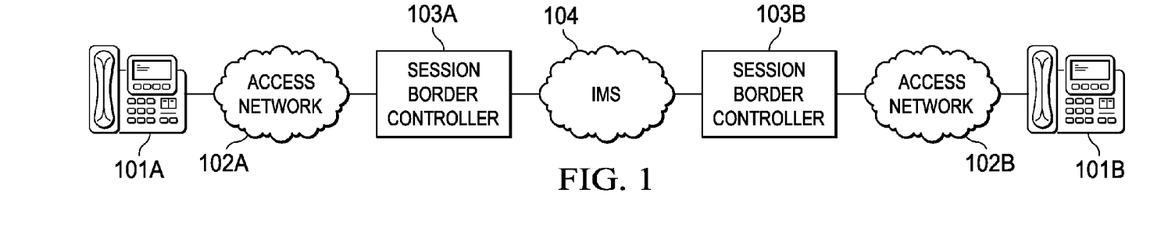
FIG. 1 is a block diagram of an example of a telecommunications environment according to some embodiments.

Turning now to FIG. 1, a block diagram of telecommunications environment 100 is depicted. In this example, environment 100 includes two end-user devices 101A and 101B, each coupled to a distinct access network 102A and 102B, respectively. Session Border Controllers (SBCs) 103A and 103B allow access networks 102A to 103B, respectively, to communicate with each other via IP Multimedia Subsystem (IMS) 104.

In some embodiments, end-user devices 101A and 101B may include, for example, analog telephones, digital telephones, teleconferencing systems, desktop computers, network appliances, cellular phones, smartphones, tablet computers, netbooks, laptops, etc. Each of access networks 102A and 102B may include one or more wireless networks, circuit-switched networks, packet-switched networks, or any combination thereof to enable VoIP communications between end-user devices 101A and 101B.

For example, access networks 102A and 102B may include a Public Switched Telephone Network (PSTN), one or more cellular networks (e.g., third generation (3G), fourth generation (4G), Long Term Evolution (LTE) wireless networks, etc.), satellite networks, computer or data networks (e.g., wireless networks, Wide Area Networks (WANs), metropolitan area networks (MANs), Local Area Networks (LANs), Virtual Private Networks (VPN), the Internet, etc., or the like. As such, in some cases, some calls may be entirely VoIP end-to-end, while others may be carried over a portion of a circuit-switched network (or any other type of network) and over a portion of an IP network (e.g., one leg of a call may be circuit-switched, then transported over IP). Also, in this implementation, IMS 104 represents an IP multimedia and telephony core network defined by the 3rd Generation Partnership Project (3GPP) standards and organizations based on Internet Engineering Task Force (IETF) protocols.

SBCs 103A and 103B may be computing devices configured to control signaling and to handle media streams involved in setting up, conducting, and tearing down telephone calls or other interactive media communications.

To each of SBCs 103A and 103B, a given VoIP call may include one or more call signaling message exchanges that control the call, and one or more call media streams which carry the call's audio, video, or other data along with information of call statistics and quality. Together, these streams make up a "session." In some cases, SBC 103A or 103B may be deployed at the edge of a corporate network, where a firewall (not shown) demarcates a local network (i.e., within the corporation) from the rest of the Internet (i.e., outside the corporation). Additionally or alternatively, filtering routers or other network elements may be used to control the flow of data streams, and SBCs 103A and/or 103B may assist policy administrators in managing the flow of session data across these borders.

It should be noted that while the transcoding operations are described herein as being performed at an SBC in some embodiment, in some instances the transcoding may occur in other device(s) on a network. Accordingly, the techniques described herein may be similarly applied to computing the latency attributable to any such transcoding.

It should also be noted that, in various applications, a telecommunications environment may include elements not shown in FIG. 1 for sake of simplicity. For example, various routers, gateways, network processors, etc. may be used to interface access networks 102A and 102B to SBCs 103A and 103B, respectively, as well as to interface SBCs 103A and 103B with IMS 104. In other implementations, different network architectures may be employed with different configurations and/or other devices.

Figure 2:
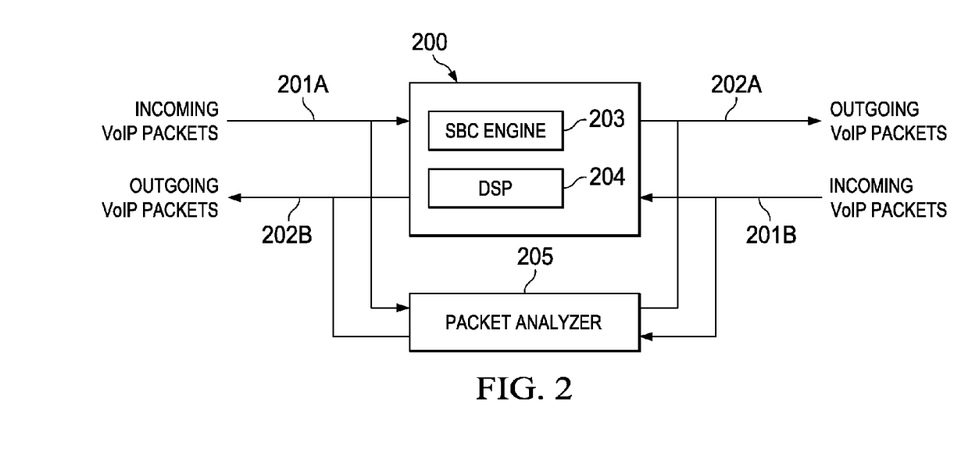
FIG. 2 is a block diagram of an example of a Session Border Controller (SBC) and packet analyzer according to some embodiments.

FIG. 2 is a block diagram of an example of SBC 200 and packet analyzer 205. In some embodiments, SBC 200 may be used as SBCs 103A and/or 103B shown in FIG. 1. Particularly, SBC 200 includes SBC engine 203 and DSP 204. In an upstream direction of a VoIP call, SBC 200 receives incoming VoIP packets 201A and transmits outgoing VoIP packets 202A. In a downstream direction of the same (or other) VoIP call, for instance, SBC 200 receives incoming VoIP packets 201B and transmits outgoing VoIP packets 202B. Meanwhile, packet analyzer 205 is a computing device configured to tap into incoming VoIP packets 201A/B as well as outgoing VoIP packets 202A/B, for example, to perform one or more analysis or network performance operations.

In some embodiments, SBC engine 203 may be configured to perform one or more of the following operations: security (e.g., protection from malicious attacks, etc.), connectivity (e.g., network address translation traversal, protocol translations, etc.), Quality-of-Service (QoS) (e.g., traffic policing, resource allocation, rate limiting, etc.), regulatory (e.g., emergency calls, etc.), media services (e.g., media transcoding, etc.), and statistics and billing information. With respect to media services, SBC engine 203 may be configured to offload incoming VoIP packets 201A/B to DSP 204. DSP 204 may in turn be configured to transcode a packet's payload between different codecs.

As noted above, VoIP packets 201A/B and 202A/B may be transmitted using the RTP protocol, and the payload, sequence number, time stamp, SSRC, and CSRC of a transcoded, outgoing RTP packet, are different from those found in a corresponding source or incoming RTP packet. Thus, ordinarily, packet analyzer 205 would be unable to correlate an incoming VoIP packet with a corresponding outgoing VoIP packet, whether in the upstream or downstream direction. Using systems and methods described herein, however, SBC 200 may cooperate with packet analyzer 205 so as to allow packet analyzer 205 to match a particular incoming VoIP packet with a transcoded outgoing VoIP packet, and therefore calculate a latency attributable to the transcoding process. These, and other operations, are discussed in more detail below in connection with FIG. 3.

In some embodiments, the modules or blocks shown in FIG. 2 may represent sets of software routines, logic functions, and/or data structures that, when executed by a processor-based device, perform specified operations. Although these modules are shown as distinct logical blocks, in other embodiments at least some of the operations performed by these modules may be combined in to fewer blocks. That is, while shown as distinct blocks in FIG. 2 for ease of illustration and discussion purposes, the various blocks may not be separate, distinct identifiable blocks or modules in a given implementation. For example, in some implementations, DSP 204 may be located externally from SBC 200, and therefore may be a separate physical entity. Additionally or alternatively, packet analyzer 205 may be combined with SBC engine 203 within SBC 200. Additionally or alternatively, packet analyzer 205 may be similarly employed with another network device that performs transcoding operations. Although shown with a particular configuration, in other embodiments these various modules or blocks may be rearranged in other suitable ways as will be readily apparent to those of ordinary skill in the art in light of this specification.

Figure 3:
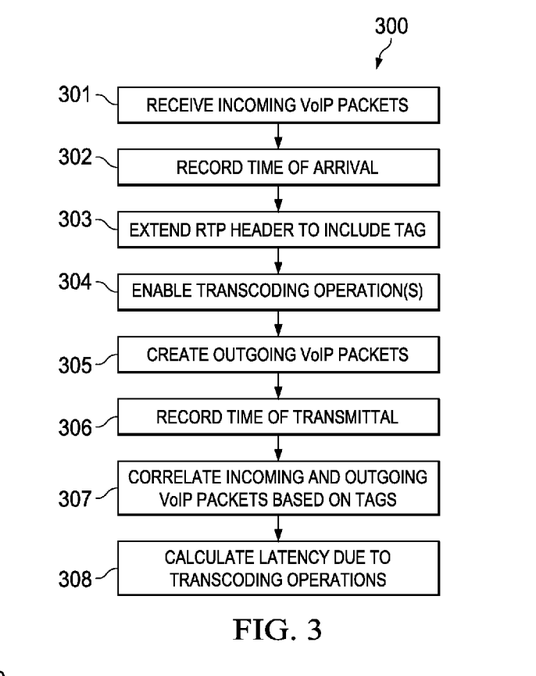
FIG. 3 is a flowchart of an example of a method of computing latency introduced by media transcoding operations according to some embodiments.

FIG. 3 is a flowchart of an example of a method of computing latency introduced by media transcoding operations. In some embodiments, method 300 may be performed, at least in part, by SBC engine 203, DSP 204, and/or packet analyzer 205 of FIG. 2. At block 301, method 300 receives incoming VoIP packets (e.g., packets 201A). Then, at block 302, method 300 records the time of arrival of each VoIP packet. In some embodiments, SBC engine 203 and/or packet analyzer 205 may maintain a database listing each incoming VoIP packet along with its respective time of arrival at SBC 200. Additionally or alternatively, SBC engine 203 and/or packet analyzer 205 may record the time of arrival of a given packet within the packet itself (e.g., within the packet's header).

At block 303, method 300 extends the RTP header of each incoming VoIP packet. For example, the Network Working Group of the IETF has published Request for Comments (RFC) 5285 ("A General Mechanism for RTP Header Extensions"), which specifies a standard procedure for extending the header of RTP packets. As the inventors hereof have determined, once the header of an incoming RTP packet has been extended in this manner, extension bits added to that header are maintained after transcoding in the corresponding outgoing RTP packet, thus allowing correlation by packet analyzer 205. In other words, when SBC engine 203 and DSP 204 come across extension data which it cannot understand but is in conformance with RFC 5285, SBC engine 203 and DSP 204 simply copy this unknown header portion into the newly constructed RTP packet with the transcoded payload data and send it out to its destination.

In some implementations, SBC 200 may employ a one byte header extension procedure. In the one-byte header form of extensions, a 16-bit value required by the RTP specification for a header extension, labeled in the RTP specification as "defined by profile," takes the fixed bit pattern "0xBEDE." Each extension element starts with a byte containing an ID followed by a length. A 4-bit ID is a local identifier of this element in the range of 1-14 bits (inclusive), which is also referred to as the valid range. A 4-bit length is the number minus one of data bytes of this header extension element. Therefore, the value zero in this field indicates that one byte of data follows this one-byte header.

For example, the header extension bit of the RTP data header may be set to "1," which informs that a header extension data follows immediately after the RTP header of the incoming VoIP packet. The length may be defined as "00 01," the 4 bit ID as "1010," and the 4-bit length may be "0000" which means that 1 byte of data follows this one-byte header. Generally, the 4 bit ID may uniquely identify that the RTP packet header extension is used for measuring latency. Then, one byte of data (i.e., a "tag") may be set to be a monotonically increasing integer value from 0 to 255, and then reset back to 0 once it reaches 255. The purpose of this data is to tag the RTP packet with an integer value which is used for uniquely identifying outgoing RTP packets that are sent out.

Figure 4:
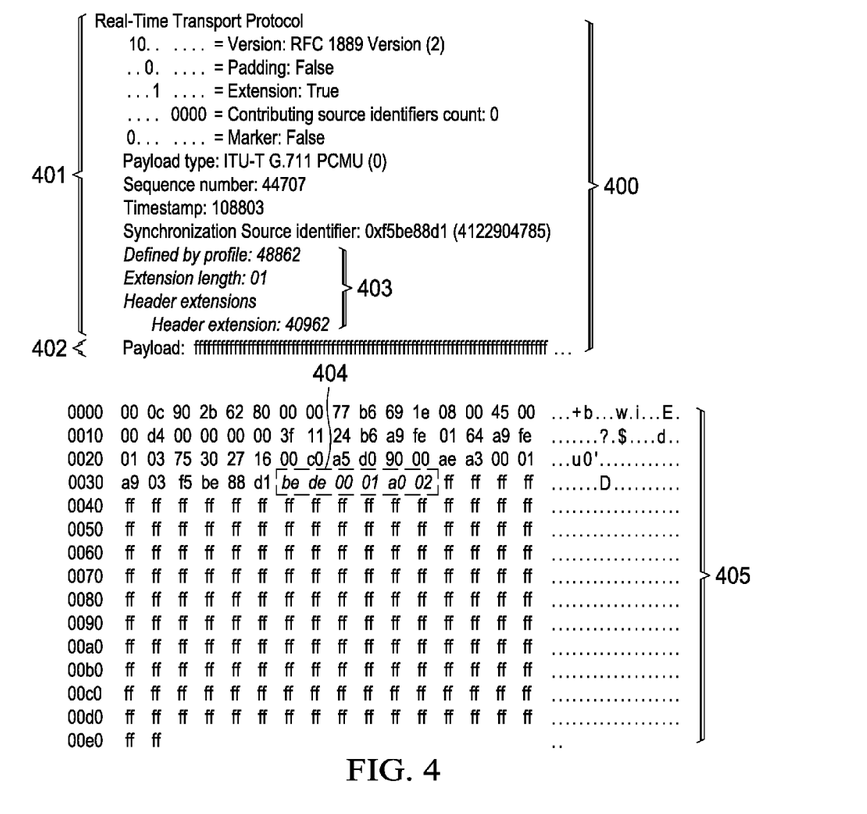
FIG. 4 is an example of a Real-Time Transport Protocol (RTP) packet with an extended header according to some embodiments.

Referring to FIG. 4, an example of a Real-Time Transport Protocol (RTP) packet with an extended header according to some embodiments. As shown, RTP packet 400 includes header portion 401 and payload portion 402. Header portion 401 includes header extension portion 403. Particularly, header extension portion 403 includes a "defined by profile" field, which is set to "48862" to indicate that it is part of a header extension; an "extension length" field, which as noted above is set to "01;" and a "header extension" field having a value of "40962" (i.e., a tag or ID). RTP packet 400 is also shown in hexadecimal format 405, with elements 404 being the actual bytes transmitted in the packet that correspond to header extension portion 403.

Referring back to FIG. 3, at block 304 one or more transcoding operations are enabled. For instance, SBC engine 203 may transmit incoming VoIP packets to DSP 204. DSP 204 may decode the payload portion of the incoming VoIP packet using a given codec and then encode the decoded information with a different codec. DSP 204 may then return the transcoded VoIP packet to SBC engine 203, which at block 305 creates an outgoing VoIP packet using the transcoded payload. As previously noted, conventional data fields in the header of the incoming and outgoing VoIP packets do not match each other, except for the 1-byte header extension field or tag discussed above.

At block 306, SBC engine 203 and/or packet analyzer 205 may record in a database the time of transmittal (e.g., by SBC 200) of each transcoded, outgoing VoIP packet. Additionally or alternatively, SBC engine 203 and/or packet analyzer 205 may record the time of transmittal of a given packet within the packet's header.

At block 307, method 300 correlates each incoming VoIP packet to each outgoing VoIP packet. Particularly, packet analyzer 205 may, for each outgoing VoIP packet, attempt to match its header extension field or tag to the tag of an incoming VoIP packet. When matching packets are found, method 300 may calculate the latency due to the transcoding operations taking place within SBC 200, for example, by subtracting the time of transmittal of the outgoing VoIP packet from the time of arrival of the corresponding incoming VoIP packet.

Once a predetermined number of VoIP packets has been correlated, packet analyzer 205 may generate any suitable statistics as to how much latency was introduced by the transcoding process. Packet analyzer 205 may then display those statistics in graphical format or in a user readable format. In some embodiments, packet analyzer 205 may be configured to analyze the performance of SBC 200 with various percentages of transcoding call loading patterns to correlate latency values with transcoded call load in SBC 200.

In some embodiments, the operations of method 300 may be performed by any of SBC engine 203, DSP 204, and/or packet analyzer 205; during a VoIP call in real-time and/or after the VoIP call has been terminated. For example, a portion of incoming VoIP packets 201A/B may be selected for transcoding latency analysis based upon one or more of their codecs, RTP ports, IP address (source and/or destination), time of arrival at SBC 200, etc. As such, valuable statistics regarding different subsets of data may be generated by packet analyzer 205. In some applications, the results of a transcoding latency analysis may be used in order to prioritize certain subsets of VoIP traffic live as they occur, for network diagnostic operations, benchmarking, or the like.

Again, the operations described as being performed by the aforementioned components in connection with an SBC may similarly be performed by an engine, processor, and packet analyzer employed in connection with any other device on a network that performs media transcoding. Thus, the scope of the concepts described herein is not necessarily limited to applications that relay upon SBC-based transcoding.

Figure 5:
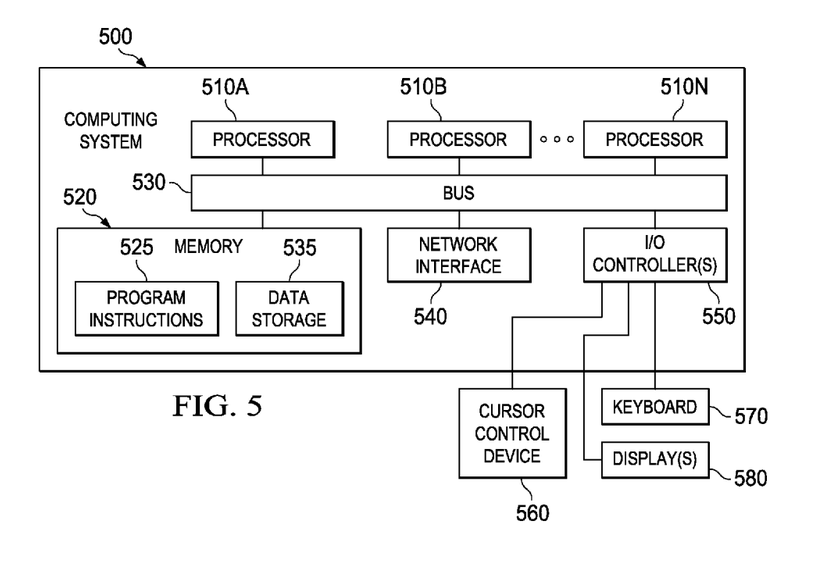
FIG. 5 is a block diagram of an example of a computer system configured to implement various systems and methods described herein according to some embodiments.

As noted above, embodiments of systems and methods for computing latency introduced by media transcoding operations may be implemented or executed, at least in part, by one or more computer systems. One such system is illustrated in FIG. 5. In various embodiments, system 500 may be a server, a workstation, a desktop computer, a laptop, a tablet computer, a mobile device, a smart phone, or the like. In some cases, system 500 may be used to implement SBC 200, DSP 204, and/or packet analyzer 205 shown in FIG. 2.

As illustrated, computer system 500 includes one or more processor(s) 510A-N coupled to system memory 520 via bus 530. Computer system 500 further includes network interface 540 coupled to bus 530, and one or more input/output (I/O) controller(s) 550 coupled to cursor control device 506, keyboard 570, and display(s) 580.

In various embodiments, computer system 500 may be a single-processor system including one processor 510A, or a multi-processor system including two or more processors 510A-N (e.g., two, four, eight, or another suitable number). Processor(s) 510A-N may include any processor capable of executing program instructions. For example, in various embodiments, processor(s) 510A-N may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processor(s) 510A-N may commonly, but not necessarily, implement the same ISA. Also, in some embodiments, at least one processor 510A may be a graphics processing unit (GPU) or other dedicated graphics-rendering device.

System memory 520 may be configured to store program instructions and/or data accessible by processor(s) 510A-N. In various embodiments, system memory 520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in connection with FIG. 3, may be stored within system memory 520 as program instructions 525 and data storage 535, respectively. In other embodiments, program instructions and/or data may be received, sent or stored upon different types of computer-accessible media or on similar media separate from system memory 520 or computer system 500.

Generally speaking, a computer-accessible medium may include any tangible or non-transitory storage media or memory media such as electronic, magnetic, or optical media—e.g., disk or CD/DVD-ROM coupled to computer system 500 via I/O interface 530. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may then be transmitted by transmission media or signals such as electrical, electromagnetic, or digital signals, which may be conveyed via a communication medium such as a network and/or a wireless link.

In an embodiment, bus 530 may be configured to coordinate traffic between processor(s) 510A-N, system memory 520, and any peripheral devices, including network interface 540 and I/O controller(s) 550. In some embodiments, bus 530 may perform any necessary protocol, timing or other data transformations to convert data signals from one component (e.g., system memory 520) into a format suitable for use by another component (e.g., processor(s) 510A-N). In some embodiments, bus 530 may include support for devices attached through various types of peripheral buses, such as a variant of the Peripheral Component Interconnect (PCI) bus standard or the Universal Serial Bus (USB) standard, for example. In some embodiments, the operations of bus 530 may be split into two or more separate components, such as a northbridge chipset and a southbridge chipset, for example. In addition, in some embodiments some or all of the functionality of bus 530, such as an interface to system memory 520, may be incorporated directly into processor(s) 510A-N.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example, via telecommunications/telephony networks such as analog voice networks or digital fiber communications networks; via storage area networks such as FibreChannel SANs, or via any other suitable type of network and/or protocol.

I/O controller(s) 550 may, in some embodiments, enable communications with display terminals, keyboards, keypads, touchpads, scanning devices, RFID readers, NFC readers, voice or optical recognition devices, or any other devices suitable for entering or retrieving data by one or more computer system 500. Multiple I/O controllers 550 may be present in computer system 500 or may be distributed on various nodes of computer system 500.

As shown in FIG. 5, memory 520 may include program instructions 525, configured to implement certain embodiments described herein, and data storage 535, comprising various data may be accessible by program instructions 525. In an embodiment, program instructions 525 may include software elements of embodiments illustrated in the above figures. For example, program instructions 525 may be implemented in various embodiments using any desired programming language, scripting language, or combination of programming languages and/or scripting languages (e.g., C, C++, C#, Java™, JavaScript™, Perl, etc.). Data storage 535 may include data that may be used in these embodiments (e.g., recorded communications, profiles for different modes of operations, etc.). In other embodiments, other or different software elements and data may be included.

A person of ordinary skill in the art will appreciate that computer system 500 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system or processor-based configurations.

Although certain embodiments are described herein with reference to specific examples, numerous modifications and changes may be made in light of the foregoing description. Accordingly, the specification and figures are to be regarded in an illustrative rather than a restrictive sense, and all such modifications are intended to be included within their scope. Any benefits, advantages, or solutions to problems that are described herein with regard to specific embodiments are not to be construed as a critical, required, or essential feature or element of any or all the claims. Furthermore, it should be understood that the various operations described herein may be implemented in software, hardware, or a combination thereof. The order in which each operation of a given technique is performed may be changed, and the elements of the systems illustrated herein may be added, reordered, combined, omitted, modified, etc. It is intended that the embodiments described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as "connected" and/or "in communication with," although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
  receiving, by a computing device including or coupled to a Digital Signal Processor (DSP), an incoming Real-Time Protocol (RTP) packet including information encoded with a first codec, wherein the incoming RTP packet includes a Voice-over-Internet Protocol (VoIP) packet;
  passing the incoming RTP packet to the DSP;
  decoding, by the DSP, a payload portion of the information using the first codec;
  extending a header of the incoming RTP packet to include a tag that uniquely identifies the incoming RTP packet with respect to a plurality of other incoming RTP packets;
  encoding, by the DSP, the decoded information using a second codec to create a transcoded RTP packet, the second codec different from the first codec;
  passing the transcoded RTP packet to the computing device;

creating, by the computing device using the transcoded RTP packet, an outgoing RTP packet including the information encoded with the second codec, wherein the outgoing RTP packet and the incoming RTP packet have at least two different features selected from the group consisting of: payload encodings, sequence numbers, time stamps, Synchronization Source Identifiers (SSRCs), and Contributing Source IDs (CSRCs);

copying, by the computing device, the tag into an extended header of the outgoing RTP packet; and computing, by a packet analyzer or the DSP, a latency associated with the decoding and encoding operations at least in part, by matching the outgoing RTP packet with the incoming RTP packet based upon the tag.

2. The method of claim 1, wherein the computing device includes a Session Border Controller (SBC).

3. The method of claim 1, wherein computing the latency includes identifying the incoming RTP packet among a plurality of other incoming RTP packets as being correlated with the outgoing RTP packet among a plurality of other outgoing RTP packets.

4. The method of claim 1, wherein the tag includes a monotonically increasing integer value.

5. The method of claim 1, further comprising extending the header of the incoming RTP packet to include: a defined-by-profile field and an extension length field.

6. The method of claim 1, wherein computing the latency includes calculating a difference between a time of transmission of the outgoing RTP packet and a time of receipt of the incoming RTP packet.

7. The method of claim 1, wherein computing the latency comprises computing the latency during a RTP call to which the incoming and outgoing RTP packet belong.

8. A computing device having a processor and a memory coupled to the processor, the memory configured to store program instructions executable by the processor to cause the computing device to:

receive a plurality of incoming Real-Time Protocol (RTP) packets and record a time of arrival of each of the plurality of incoming RTP packets, wherein the plurality of incoming RTP packets include Voice-over-Internet Protocol (VoIP) packets;

extend headers of each incoming RTP packet to include tags that uniquely identify each incoming RTP packet with respect to other incoming RTP packets;

enable transcoding operations configured to transcode payload information within the plurality of incoming RTP packets, wherein the transcodinq operations are performed by a Digital Signal Processor (DSP) coupled to or part of the computing device;

create a plurality of outgoing RTP packets using the transcoded payload information;

for each of the outgoing RTP packets, copy a tag of a corresponding incoming RTP packet in an extended header of the outgoing RTP packet;

record a time of transmission of each of the plurality of outgoing RTP packets, wherein each outgoing RTP packet and corresponding incoming RTP packet have at least two different features selected from the group consisting of: payload encodings, sequence numbers, time stamps, Synchronization Source Identifiers (SSRCs), and Contributing Source IDs (CSRCs); and provide the plurality of incoming and outgoing RTP packets to the DSP or to a packet analyzer coupled to or part of the computing device, the packet analyzer configured to match at least one of the plurality of incoming RTP packets to a corresponding one of the plurality of outgoing RTP packets based upon the tags, the packet analyzer further configured to calculate a latency associated with a transcoding operation performed upon payload information within the at least one of the plurality of incoming RTP packets based upon a difference between a time of transmission of the corresponding one of the plurality of outgoing RTP packets and a time of arrival of the at least one of the plurality of incoming RTP packets, wherein, in operation: (a) the computing device transmits the incoming RTP packets to the DSP, (b) the DSP decodes a payload portion of the incoming RTP packets using a first codec and then encodes the decoded information with a second codec to create transcoded RTP packets, (c) the computing device returns the transcoded RTP packets to the computing device, and (d) the computing device creates the outgoing RTP packets using the transcoded RTP packets.

9. The computing device of claim 8, wherein the outgoing RTP packets are Voice-over-Internet Protocol (VoIP) packets.

10. The computing device of claim 8, wherein the tag includes a monotonically increasing integer value.

11. The computing device of claim 8, wherein to extend headers of each incoming RTP packet, the program instructions are further executable by the processor to cause the computing device to include, in each header of each incoming RTP packet: a defined-by-profile field and an extension length field.

12. A memory device having program instructions stored thereon that, upon execution by a processor coupled to the memory device within a computing system, cause the computing system to:

receive, by the processor, incoming Real-Time Protocol (RTP) packets, wherein each of the incoming RTP packets includes incoming Voice-over-Internet Protocol (VoIP) packets, and wherein each has a payload encoded with a first codec and having a time of arrival;

identify, by the processor, extended headers of each incoming RTP packet, each extended header including a tag that uniquely identifies each incoming RTP packet with respect to other incoming RTP packets;

receive, by the processor, outgoing RTP packets, each having a payload encoded with a second codec and having a time of transmission, wherein each outgoing RTP packet and corresponding incoming RTP packet have at least two different features selected from the group consisting of: payload encodings, sequence numbers, time stamps, Synchronization Source Identifiers (SSRCs), and Contributing Source IDs (CSRCs);

identify, by the processor, extended headers of each outgoing RTP packet, each extended header including a tag that matches the tag of a corresponding incoming RTP packet;

correlate, by the processor, one of the incoming RTP packets with a corresponding one of the outgoing RTP packets based upon the identified tags; and calculate, by the processor, a latency associated with a transcoding of the one of the incoming RTP packets into the corresponding one of the outgoing RTP packets based upon a difference between the time of transmission of the corresponding one of the outgoing RTP packets and the time of arrival of the one of the incoming RTP packets, wherein the receiving, identifying, and correlating are performed by the computing system, wherein the computing system includes or is coupled to a Digital Signal Processor (DSP), wherein the calculating is performed by the DSP or a packet analyzer coupled to or part of the computing system, and wherein, in operation:

(a) the computing system transmits the incoming RTP packets to the DSP, (b) the DSP decodes payload portions of the incoming RTP packets using the first codec and then encodes the decoded information with a second codec to create transcoded RTP packets, (c) the DSP returns transcoded RTP packet to the computing system, and (d) the computing system creates outgoing RTP packets using the transcoded RTP packets.

13. The memory device of claim 12, wherein the tag includes a monotonically increasing integer value.

14. The memory device of claim 12, wherein to extend headers of each incoming RTP packet, the program instructions further cause the computing system to include, in each header of each incoming RTP packet: a defined-by-profile field and an extension length field.

15. A method, comprising:
  receiving incoming Real-Time Protocol (RTP) packets, wherein each of the incoming RTP packets includes incoming Voice-over-Internet Protocol (VoIP) packets, and wherein each of the incoming VoIP packets has a time of arrival and a payload encoded with a first codec;
  identifying extended headers of each incoming RTP packet, each extended header including a tag that uniquely identifies each incoming RTP packet with respect to other incoming RTP packets;
  receiving outgoing RTP packets, each having a time of transmission and a payload encoded with a second codec, wherein each outgoing RTP packet and corresponding incoming RTP packet have at least two different features selected from the group consisting of: payload encodings, sequence numbers, time stamps, Synchronization Source Identifiers (SSRCs), and Contributing Source IDs (CSRCs);
  identifying extended headers of each outgoing RTP packet, each extended header including a tag that matches the tag of a corresponding incoming RTP packet; and
  calculating a latency associated with a transcoding of at least one of the incoming RTP packets into at least one corresponding one of the outgoing RTP packets based the identified tags and upon a difference between the time of transmission of the at least one corresponding one of the outgoing RTP packets and the time of arrival of the at least one of the incoming RTP packets, wherein the receiving and identifying are performed by a computer including or coupled to a Digital Signal Processor (DSP), wherein the calculating is performed by a packet analyzer coupled to or part of the computer, and wherein, in operation: (a) the computer transmits the incoming RTP packets to the DSP, (b) the DSP decodes a payload portions of the incoming RTP packets using the first codec and then encodes the decoded information with a second codec to create transcoded RTP packets, (c) the DSP returns the transcoded RTP packets to the computer, and (d) the computer creates the outgoing RTP packets using the transcoded RTP packets.

16. The method of claim 15, wherein the extended headers of each incoming RTP packet to include: a defined-by-profile field and an extension length field, and wherein each tag includes a monotonically increasing integer value.

\* \* \* \* \*